United States Patent
Best et al.

(10) Patent No.: US 7,700,241 B2
(45) Date of Patent: Apr. 20, 2010

(54) POLYMER ELECTROLYTE; AND AN ELECTROCHEMICAL DEVICE EQUIPPED WITH SUCH A POLYMER ELECTROLYTE

(75) Inventors: Adam Samuel Best, Burwoord Victoria (AU); Sebastien Mathieu Jean Viale, Lausanne (NL); Stephen James Picken, The Hague (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 612 days.

(21) Appl. No.: 11/569,608

(22) PCT Filed: May 25, 2005

(86) PCT No.: PCT/IB2005/051706

§ 371 (c)(1),
(2), (4) Date: Nov. 27, 2006

(87) PCT Pub. No.: WO2005/117188

PCT Pub. Date: Dec. 8, 2005

(65) Prior Publication Data
US 2008/0045615 A1    Feb. 21, 2008

(30) Foreign Application Priority Data
May 27, 2004  (EP) .................... 04102356

(51) Int. Cl.
*H01M 8/10* (2006.01)
*H01M 10/40* (2006.01)
(52) U.S. Cl. .............. 429/307; 429/33; 429/310; 429/314; 429/315; 429/317; 521/27
(58) Field of Classification Search .............. None
See application file for complete search history.

(56) References Cited

U.S. PATENT DOCUMENTS

| 6,025,457 A | 2/2000 | Ohno et al. |
| 6,365,301 B1 | 4/2002 | Michot et al. |
| 2001/0020084 A1 | 9/2001 | Aoki et al. |
| 2003/0023001 A1* | 1/2003 | Kerr et al. .................... 525/242 |
| 2003/0035991 A1 | 2/2003 | Colombo et al. |

FOREIGN PATENT DOCUMENTS

WO    2005117188 A1    12/2005

OTHER PUBLICATIONS

Maria Forsyth personal webpage from www.monash.edu (available online before 2003).*
Written Opinion of the International Searching Authority PCT/IB2005/051706.

* cited by examiner

*Primary Examiner*—David Wu
*Assistant Examiner*—Vu Nguyen

(57) ABSTRACT

Disclosed is a polymer electrolyte for use in an electrochemical device. Said polymer electrolyte comprises at least one polymer having ion-exchangeable functional groups. The polymer also comprises ionic liquid functional groups. The ion-exchangeable functional groups comprise a polymer-bound anionic group, such as a sulfonate, a carboxylate, and a phosphonate or any anionic surfactant group. Also disclosed is an electrical device that comprises said polymer electrolyte material. Such electrical device preferably consists of a fuel cell, an electrical battery, a super capacitor, an electrochromic window or a solar cell.

25 Claims, 3 Drawing Sheets

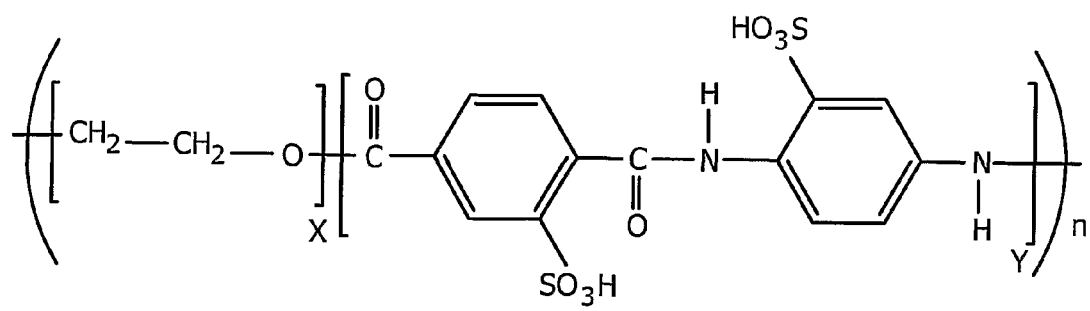
FIG. 6
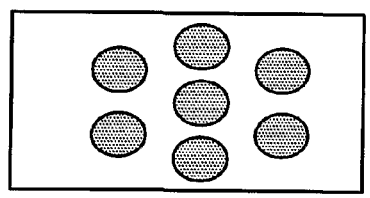    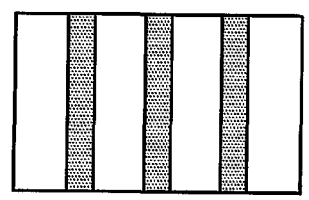
FIG. 7a          FIG. 7b

POLYMER ELECTROLYTE; AND AN ELECTROCHEMICAL DEVICE EQUIPPED WITH SUCH A POLYMER ELECTROLYTE

The invention relates to a polymer electrolyte for use in an electrochemical device. The invention further relates to an electrical device comprising such a polymer electrolyte.

Current polymer electrolyte materials, such as Nafion®, are limited in use due to a loss of membrane performance at elevated temperatures, above 80° C. and especially above 100° C. The ion-exchangeable sulfonate groups in Nafion®, improve the mobility of counter ions, for instance protons, lithium, sodium, potassium and other suitable inorganic or organic cations. If the polymer electrolyte is wetted by a solvent, in particular water or methanol, these mobile cations remain dissociated in solution from the sulfonate groups. The conductivity of the existing polymer electrolytes at the elevated temperatures is unsatisfactory because of insufficient solvent retention: the solvent evaporates from the polymer electrolyte. At temperatures above 80° C. and in particular above 100° C., solvent evaporates from the polymer electrolyte material. Desolvation (dehydration in case where water or methanol is used) causes an increased electrostatic interaction between the conducting cations and the anionic groups of the polymer. The diminished degree of dissociation results in inefficient ion conduction, and a decreased performance of the polymer electrolyte.

When an existing polymer electrolyte such as Nafion® is applied in an electrochemical device, the temperature range at which the device may be operated is limited by the loss of conductivity at elevated temperatures (above 80° C.). In order to prevent the evaporation of solvent (typically water or an aqueous solution) during continued operation of the device, the operational range is restricted to temperatures below 80° C. One particular example of an electrochemical device in which a polymer electrolyte operable at elevated temperatures would be desirable is a fuel cell. The operation of a fuel cell at elevated temperatures, above 80° C., has the benefit of reducing CO poisoning of the catalytic surface of the fuel cell electrode and the electrolyte. As the current polymer electrolytes are limiting the operable temperature of the electrochemical device in which the polymer electrolyte is used, there is great need for electrolytes that would overcome this limitation.

The invention aims to provide a polymer electrolyte material for use in an electrochemical device that provides sufficient ion conductivity at ambient as well as elevated temperatures.

The invention provides a polymer electrolyte for use in an electrochemical device, said polymer electrolyte comprising at least one polymer having ion-exchangeable functional groups, characterised in that the polymer comprises ionic liquid functional groups. In contrast to existing polymer electrolytes, a polymer electrolyte according to the invention provides sufficient ion-conduction over a wide temperature range, at both ambient temperatures and elevated temperatures (above 80° C.). Moreover, the polymer electrolyte according to the invention functions even in the absence of a solvent. In this description, ion-exchangeable functional groups are defined as ionic groups providing mobile counter ions for ion conduction. Usually, a solvent such as water is needed in order to shield the anion-cation interaction and enable ion conduction. Such a solvent is usually added to the polymer electrolyte. In the absence of a solvent, the ion-exchangeable functional groups usually bind tightly, immobilising the conducting ions. For instance, the ion-exchangeable functional groups may be acidic functional groups providing protons for ion conduction in the presence of a solvent such as water. In the absence of solvent, the protons are tightly bound by the acidic groups, hampering ion conduction. An ionic liquid functional group is defined as a functional group derived from an ionic liquid anion-cation pair. Common definitions of ionic liquids are 1) cation-anion pairs having a melting point below 100° C., and 2) cation-anion pairs behaving as a liquid at room temperature. For the current invention, ionic liquids are here defined as cation-anion pairs having a melting point below 120° C. Ionic liquid functional groups usually comprise an organic cation and an inorganic anion, of which at least either the anion or the cation is immobilised by binding to the polymer. The melting point as stated in the definition of an ionic liquid above should be interpreted as the melting point of ionic liquid functional group domains within the material of the polymer electrolyte. Thus, the melting point of ionic liquid functional groups is the temperature at which domains of ionic liquid functional group show liquid behaviour. The ionic liquid functional groups may be derived from any available ionic liquid by well-known synthetic chemical methods. Non-polymer-bound counter ions are usually bulky counter ions with low ion mobility. This is a striking difference with the small sized, mobile counter ions provided by the ion-exchangeable groups. Another difference is that, in contrast to the ion-exchangeable groups the ionic liquid functional groups may form domains in which the anions and cations of the ionic liquid form a matrix that facilitates ion mobility of smaller, conducting ions. It is very well possible that both the cation and the anion are bound to the polymer. The ionic liquid functional groups provide an ionic matrix within the polymer electrolyte that facilitates ion transport through the polymer by promoting the dissociation of mobile ions within the matrix. In contrast to solvents such as water, evaporation of the ionic liquid functional groups cannot occur as they are chemically bound to the polymer. Thus, by including ionic liquid functional groups, ion conduction is facilitated by the polymer electrolyte even in the absence of a solvent such as water. This enhances the performance of the polymer electrolyte at elevated temperatures, in particular at temperatures above the boiling point of common solvents such as water. Ion conduction by the ionic liquid groups is even increased at elevated temperatures, due to the increased thermal movement within the polymer electrolyte at these temperatures. At lower temperatures, the thermal movement of the ionic liquid is lower, and at these temperatures the contribution of the ionic liquid groups to the ion conduction is rather low compared to the contribution of the ion-exchangeable groups in the presence of a solvent.

The combination of ion-exchangeable groups and the ionic liquid groups thus provides a polymer electrolyte that is capable of ion conduction at both relatively low, as well as elevated temperatures. According to the invention, the use of any mesogenic unit containing ion-exchangeable groups or mesogenic unit with ionic liquid functionality and related structures would be anticipated by those skilled in the art. As long as sufficiently wetting solvent, such as water or methanol, is available in the polymer electrolyte the counter ions of the ion-exchangeable groups become dissociated and mobile, providing ion conduction at low temperatures. However, in the temperature range above 80° C., where the ion conduction facilitated by the ion exchangeable groups starts to drop due to the loss of solvent molecules, this is compensated by the ion conduction facilitated by the ionic liquid functional groups that increases with temperature, thus leading to sufficient ion conducting properties at both ambient and elevated (above 80° C.) temperatures.

The counter ions of the ion-exchangeable functional groups provide exchangeable mobile ions for ion conduction at relatively low temperatures (e.g. under 80° C.). Solvent molecules, preferably water molecules, facilitate the ion conduction. Depending on their exact nature (in particular their flexibility), the ionic liquid functional groups may contribute to some extent to ion conduction at relatively low temperatures. The contribution to ion conduction of the ionic liquid groups increases with increasing temperature. At elevated temperatures (above 80-100° C.), dehydration may occur if water is used in the system, and ion conduction is facilitated mostly by the ionic liquid functional groups. At elevated temperatures, mobility at the molecular level increases, and the efficiency of ion conduction by the ionic liquid functional groups increases compared to lower temperatures.

Both the ionic liquid functional groups as well as the ion-exchangeable functional groups may be incorporated into the polymer backbone, and/or attached to the polymer backbone as pendant groups. The polymer may be a linear polymer, but may just as well be a hyper branched, dendritic or mixed polymer structure. The polymer may serve as a matrix incorporating an ion-transport enhancing solvent, such as aqueous solutions, sulphuric acid, phosphoric acid, imidazole, or any (non-polymer bound) ionic liquids.

In a preferred embodiment, the ion-exchangeable functional groups comprise polymer-bound anionic groups. Anionic groups enable the use of highly mobile cationic counter ions for ion conduction, such as protons ($H^+$ or $H_3O^+$), lithium ($Li^+$), sodium ($Na^+$), potassium ($K^+$) and other suitable inorganic or organic cations. The anionic groups may be arranged in poly-anionic domains. Having multiple anionic groups at close range of each other enables facile 'hopping' of mobile conducting cations, which leads to an enhanced conductivity.

It is advantageous if the anionic groups comprise at least one of the following groups: sulfonate, carboxylate, phosphonate or any other anionic surfactant type groups. These groups serve as counter ions for mobile cationic ions, and facilitate ion conduction in the presence of water. In the presence of water molecules, these groups tend to enable a high mobility of counter ions such as ($H^+$ or $H_3O^+$), lithium ($Li^+$), sodium ($Na^+$) and potassium ($K^+$). In the absence of water or other solvent molecules, said ion-exchangeable groups tend to associate relatively strongly with cationic ions and hamper ion mobility.

In a preferred embodiment, the liquid ionic functional groups comprise polymer-bound cationic groups. Alternatively, depending on the target ion to be transported, derivatives of anionic groups may be bound to the polymer as well. In a reverse configuration, only anionic groups are bound to the polymer and the cationic group of the anion-cation pair remains unbound to the polymer as a bulky counter ion. The use of polymer-bound cationic groups leads to an enhanced thermal stability of the polymer electrolyte, as well as an improved electrochemical stability. Suitable salts of cationic groups show ionic liquid properties. Examples of suitable counter ions are bulky anions such as halide ions like chloride, $[Cl]^-$, bromide $[Br]^-$, iodide $[I]^-$, hexafluorophosphate $[PF_6]^-$, tetrafluoroborate $[BF_4]^-$, nitrate $[NO_3]^-$, acetate $[CH_3CO_2]^-$, trifluoroacetate $[CF_3CO_2]^-$, $[TFSI]^-$, $[AsF_6]^-$, $[SbF_6]^-$, $[F(HF)_2]^-$, $[BETI]^-$, methyl sulphate$[CH_3SO_3]^-$, trifluoro$[CF_3SO_3]^-$, $[N(CN)_2]^-$, Tosylate, anionic boron clusters such as $[CB_{11}H_{12}]^-$, and chloroaluminates such as $[AlCl_4]^-$ and $[AlCl_7]^-$. The bound ionic liquids form a matrix that enhances the dissociation of mobile ions. These bulky ions have a relatively low mobility, such that ion conduction is preferably performed by relatively small and mobile anions such as for instance protons, lithium ($Li^+$) or the hydroxy $OH^-$ anion. Preferably, the ion liquid groups are arranged in domains facilitating transport of conducting ions, thus lowering electrical resistance for the ion conduction of the polymer electrolyte material and increasing ion conduction performance of the polymer electrolyte.

Preferably, the cationic groups comprise derivatives of at least one of the following groups: pyridinium, imidazolium, pyrrolidinium, alkyl-ammonium, alkyl-phosphonium, sulphonium, thiazolium, triazolium, oxazolium, pyrazolium, undecenium, guanidinium, isoquinolinium. For these groups and related derivatives, derivatives are easily chemically coupled to a polymer by standard chemical coupling methods.

In a preferred embodiment, at least part of the ionic liquid functional groups is bound to the polymer by a flexible spacer of a first length. A flexible spacer improves the mobility of the ionic liquid functional group, thus improving the conduction of ions and contributing to an improved ion conductivity of the polymer electrolyte material. A typical spacer would be formed by a alkyl chain or an alkyl-ether chain, with a typical length of 2-8 atoms, preferably 3-6, most preferably 4 atoms, counted from the polymer backbone to the ionic liquid functional group. At this length, an optimum is reached between flexibility and phase separation occurring due to the hydrophobic nature of the spacer.

It is advantageous if at least some of the ion-exchangeable functional groups are bound to the polymer by a flexible spacer of a second length. A flexible spacer improves the mobility of the ion-exchangeable functional group, thus improving the conduction of ions and contributing to an improved ion conductivity of the polymer electrolyte material. A typical spacer would be formed by a alkyl chain or an alkyl-ether chain, with a typical length of 2-8 atoms, preferably 3-6, most preferably 4 atoms, counted from the polymer backbone to the ionic liquid functional group.

Preferably, the ratio of the ion-exchangeable groups with respect to the total of monomers incorporated in the polymer backbone is in the range of 10-50%, preferably 40-50%. A relatively high amount of ion-exchangeable groups ensures the availability of sufficient mobile counter ions for ion conduction at relatively low temperatures. This provides a good ion conductivity of the polymer electrolyte. Further, the high number of ion-exchangeable groups increases the ability of the polymer electrolyte to absorb and retain water. This helps to withstand the evaporation of water from the polymer, which is a key factor in maintaining sufficient conductivity at the high-end temperature range of water-assisted conductivity, in particular from 80-100° C.

Preferably, the molecular ratio of ion-exchangeable functional groups with respect to ionic liquid functional groups incorporated in the polymer is in the range of 0.5-2, preferably 0.8-1.2. Within this range, sufficient ion conductive properties are maintained at all temperatures ranging from ambient to elevated temperatures (>80° C.).

It is advantageous if the polymer comprises a block co-polymer of a relatively flexible polymer and a relatively rigid polymer. At elevated temperatures, block co-polymers show improved ion conductivity as well as an improved mechanical stability. Examples of possible combinations of a relatively flexible polymer and a relatively rigid polymer, respectively, are PEO/para-PPTA, PEO-sulfonated para-PPTA, sulfonated meta-PPTA (otherwise known as Nomex)/sulfonated para-PPTA, N,N'-dialkyl imidazolium-S-para-PPTA. A person skilled in the art would replace the polymers in these block co-polymers with any suitable polymers known in the field in order to obtain a polymer electrolyte optimized in terms of mechanical properties and/or ion-conducting properties preferred in specific applications. It is preferred the relatively flexible polymer and the relatively rigid polymer show at least partial micro-phase separation. Micro-phase separation is the self-organisation of the relatively flexible polymer and the relatively rigid polymer into domains containing an increased concentration of one type of polymer (either of the relatively flexible or the relatively rigid polymer). This self-organisation implies an increase of the ion conducting properties of the polymer electrolyte. Furthermore, it is advantageous if the relatively rigid polymer shows at least partial liquid crystalline order. The relatively rigid polymer forms liquid crystalline domains within the polymer electrolyte, which lead to an increased ion conductivity of the polymer electrolyte. The liquid crystalline ordering of the relatively rigid polymer of the block co-polymer extends the temperature range over which the domains remain organised in order to maintain an improved ion conductivity of the polymer electrolyte. The liquid crystalline order of the polymer electrolyte improves the ion conductivity at elevated temperatures. Further, the liquid crystalline order will contribute to improved mechanical stability of the electrolyte at elevated temperatures.

In a preferred embodiment of the invention, the polymer comprises sulfonated aramids. Sulfonated aramids provide the polymer electrolyte with relatively good mechanical strength, improved thermal and chemical stability. Furthermore, these aramids are easy to process and chemical engineering of the polymer is easily done as incorporation of the ionic liquid functional groups and the ion-exchangeable functional groups is conveniently achieved by well-known chemical synthetic methods.

It is advantageous if the polymer electrolyte comprises cross-links. Cross-links provide mechanical reinforcement of the electrolyte, as well as an improved thermal stability. In general, the cross-link density should be within 1-5% related to the number of monomer units in the polymer. This provides a good balance between the improved mechanical stability and the ability of the polymer to take up solvent (swelling). Sufficient swelling corresponds with the amount of solvent/liquid that may be incorporated into the polymer electrolyte, and thus influences the performance of the polymer electrolyte at ambient temperatures (below 80° C.). Although any type of cross-link may be applied, alkyl chains preferably form the cross-links. These cross-links are easily incorporated by standard cross-linking agents known in the field of polymer chemistry, such as alkyl diisocyanates, dihalogenalkyls, and cinnimate groups.

In a preferred embodiment, the polymer is incorporated in a supporting matrix structure. Preferably, the supporting matrix comprises a porous material, in order to enable good ion conduction by the polymer electrolyte. The matrix structure may comprise materials such as DSM Solupor®, Celguard®, porous PVDF, glass fibers, or any rigid polymer matrix with a porous structure, or porous ceramic material such as zeolites. The matrix structure provides improved mechanical strength, and improved thermal and electrochemical stability. The polymer may be physically or chemically bound to the matrix structure to further enhance mechanical strength and thermal stability.

The invention further provides an electrical device comprising a polymer electrolyte material, wherein the polymer electrolyte comprises at least one polymer featuring an ion-exchangeable functional groups, characterised in that the polymer features ionic liquid functional groups. Such an electrical device shows an enhanced operable temperature window, ranging from ambient temperatures (below 80° C.) to elevated temperatures (above 80° C. and preferably above 100° C.). Further, the energy efficiency of the electrical device would be improved due to decreased electrical resistance. Preferably, the electrical device is an electrochemical device. An electrochemical device is any device that either provides electrical energy through chemical reactions, or a device that uses electrical energy in order to perform chemical reactions. The applied polymer electrolyte may comprise any applicable features of the polymer electrolyte according to the invention as mentioned herein. The polymer electrolyte may be incorporated in a polymer membrane comprising a polymer electrolyte according to the invention. Such a polymer membrane consists of a thin layer with ion conduction properties. Due to the properties of the polymer electrolyte, such a membrane is applicable at elevated temperatures (over 80° C. and preferably above 100° C.), and has improved thermal stability at these temperatures. The membrane may for instance be applied to an electrode surface, for instance a metallic or carbon electrode surface. Also, such a membrane may be incorporated into electrode stacks, where the polymer electrolyte membranes are stacked between electrode layers.

In a preferred embodiment, the electrical device is a fuel cell. Apart from enhanced performance over a wider temperature range, a fuel cell according to the invention further increases the durability and overall performance of the device, as operation at temperatures above 80° C. is not diminished and poisoning of the catalyst used in the electrodes is prevented.

In another preferred embodiment, the electrical device is an electrical battery. This enables the battery to be used at elevated temperatures (above 80° C.). This is especially useful for battery-operated machines that have to operate under circumstances where elevated temperatures are to be expected, such as fire-fighting, mining and space-travel. In addition, such a battery would be suitable for high load applications where rapid discharge may cause heating of the cell. The battery may for instance be a lithium ion or lithium metal type battery.

In yet another preferred embodiment, the electrical device is a super capacitor. Such a super capacitor would show an increased lifetime expectancy as well as an improved reliability, in particular at elevated temperatures (above 80° C.).

In yet another preferred embodiment, the electrical device is an electrochromic window. Such an electrochromic window would be operable at elevated temperatures (above 80° C.). Also, the energy efficiency of the window would be improved due to decreased electrical resistance.

In yet another preferred embodiment, the electrical device is a solar cell. Such solar cells would be operable at elevated temperatures (above 80° C.), and would also benefit from an increased reliability and endurance of the device would be increased. Further, efficiency losses in the conversion from solar radiance to electricity would be cut due to decreased resistance.

Obviously, numerous types of devices may benefit from use of a polymer electrolyte according to the invention, especially when elevated operating temperatures (above 80° C. and especially above 100° C.) are to be expected.

The invention will now be illustrated by the following examples and figures.

FIGS. 1-6 show structural features of several sulfonated polyaramids that may be applied in a polymer backbone in a polymer electrolyte according to the invention. These polymers can be processed to form films or membranes suitable for incorporation in electrochemical devices, for instance fuel cells.

FIG. 7 shows an example of self-organisation of a polymer electrolyte according to the invention.

EXAMPLE 1

In this example, structural features of polymers that may be used in a polymer electrolyte according to the invention are shown.

Figure 1:
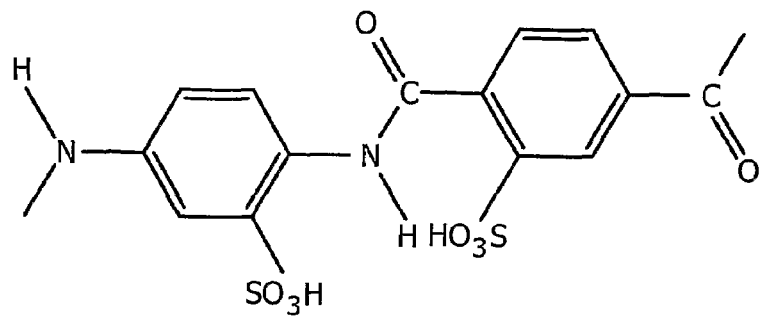

FIG. 1 shows the molecular structure of a sulfonated polyaramid, (sulfonated para-phenylene terephthalamide (S-para-PPTA) showing two ion-exchangeable sulfonate groups ($-SO_3H$). The sulfonated groups may be included regularly or in a random fashion. Instead of the sulfonate groups, also sulfonate salts with for instance lithium, sodium or potassium as the counter-ion may be applied. Instead of the mono-sulfonated monomer units, di-sulfonated monomer units would serve as well.

Figure 2:
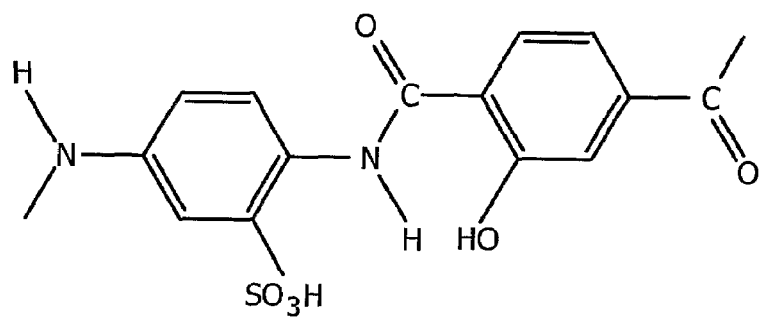

FIG. 2 shows a functionalisable sulfonated poly(aramid). The $-OH$ group on the terephthalic acid ring can be replaced by any halogen to act as a suitable leaving group for use in cross-linking or functionalisation with an ionic liquid group. The sulfonic acid group acts to hold any cation for ionic transport.

Figure 3:
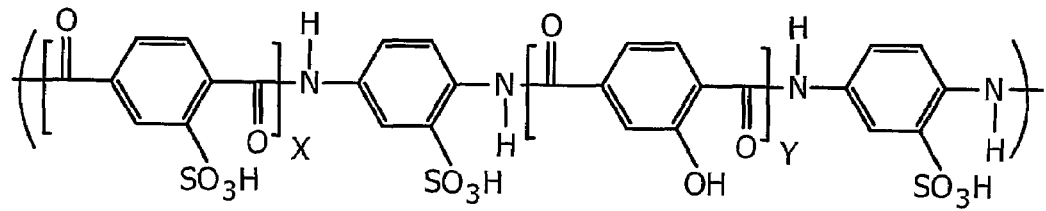

FIG. 3 shows an example of a functionalised poly(aramid) containing a ratio of sulfonated-terephthalic acid (X) and hydroxy-terephthalic acid (Y). The hydroxy-terephthalic acid can be used for cross-linking or functionalisation by an ionic liquid group.

Figure 4:
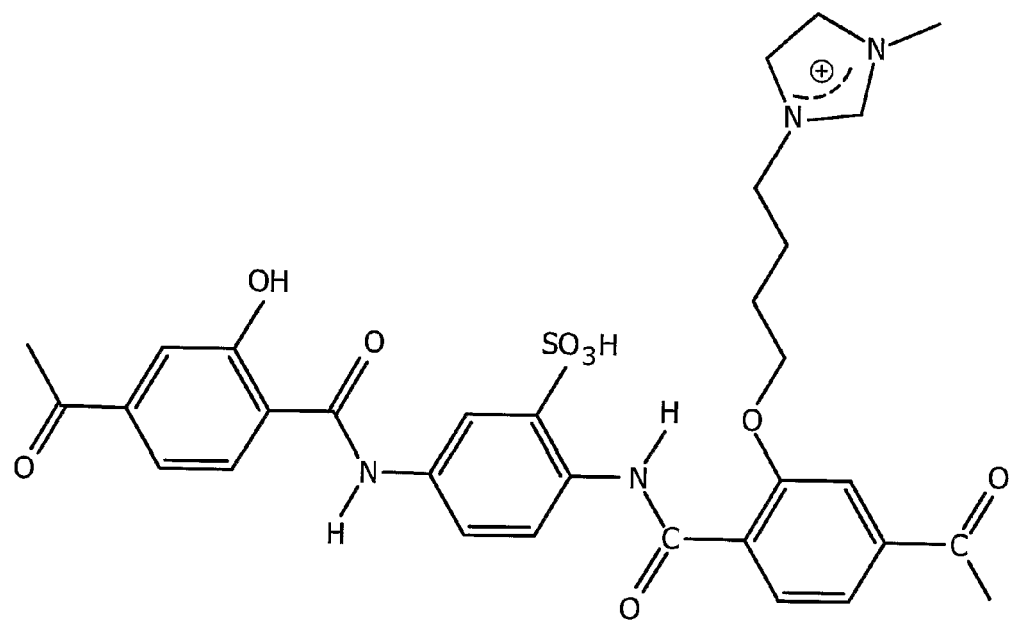

FIG. 4 shows an example of a functionalised poly(aramid) with ionic liquid functionality coupled through an alkyl linker with an ether link to the polymer back bone. The ionic liquid functional group is imidazole in this case; the counter ion is omitted for clarity. Although bulky counter ions are preferred for enhanced ion conduction, in principle any thermally stable anion may be applied. Note the $-SO_3H$ group can also be attached via an alkyl chain spacer of some length (n). In the figure, the remaining $-OH$ group can be used for cross-linking, or for the attachment of a different type of ionic liquid functional group.

EXAMPLE 2

In this example, the advantage of the use of a block co-polymer of a relatively flexible polymer and the relatively rigid polymer in a polymer electrolyte according to the invention is explained.

Figure 5:
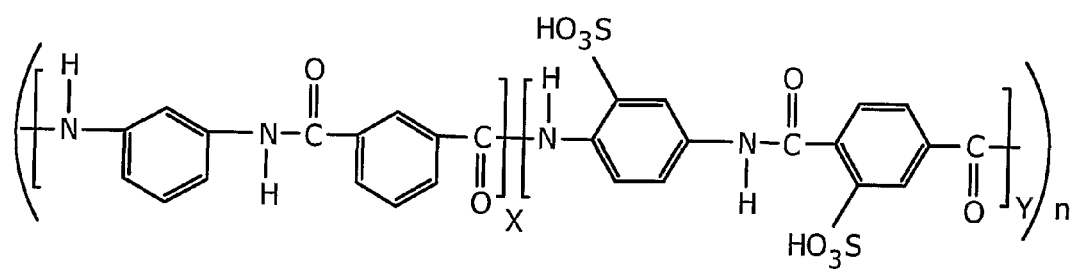

FIG. 5 is an example of a block co-polymer containing block segments of sulfonated-para-PPTA and meta-PPTA, wherein meta-PPTA is the relatively flexible polymer and para-PPTA is the relatively rigid polymer. The sulfonated para-PPTA shows liquid crystalline order, whereas meta-PPTA forms flexible coils connecting the self-organised para-PPTA domains. In this particular case, for an improved conductivity, the meta-PPTA block segments can be sulfonated. The ratio of meta-PPTA (X) to sulfonated para-PPTA (Y) can be varied in order to obtain micro-phase separation of the polymer components. Micro-phase separation leads to an improved ion conductivity, in particular at elevated temperatures when thermal movement is increased. At certain ratios of para-PPTA and meta-PPTA, also depending on the length of the block segments, liquid crystalline order may induce the formation of hexagonal "channelled" structures (see FIG. 7), whereby ions are channelled through the flexible segments at lower temperatures leading to an even better ion conductivity at elevated temperatures.

FIG. 6 shows another example of a block co-polymer, using the relatively flexible poly(ethylene oxide) (PEO) and the relatively rigid sulfonated-para-PPTA. Sulfonated-para-PPTA also shows liquid crystalline properties, enabling the self-organisation of the block co-polymer into domains comprising predominantly sulfonated-para-PPTA and domains comprising predominantly PEO.

For both FIGS. 5 and 6, it can also be envisaged that variations of both FIG. 3 and FIG. 4 could also be incorporated into the block co-polymers to introduce ionic liquid functionality and the ability to cross-link the rigid segments.

FIGS. 7a and 7b show the templated structure within a membrane of a polymer electrolyte according to the invention using the micro-phase separation between the rigid and coil segments of a block co-polymer, for instance the block co-polymers from FIG. 5 or 6. FIG. 7a shows a top view of the membrane (1) with the arrangement of the flexible segments of the polymer into domains 2 shown as circles, surrounded by the matrix of the rigid polymer 3. In FIG. 7b, a side view of the membrane 4 shows the tubes 5 of flexible polymer within the rigid polymer matrix 6. Such structures can be formed by the controlled evaporation of the solvent and the spontaneous organisation of the material.

The invention claimed is:

1. Polymer electrolyte for use in an electrochemical device, said polymer electrolyte comprising at least one polymer having polymer-bound ion-exchangeable functional groups, characterised in that the polymer comprises ionic liquid functional groups comprising cation-anion pairs having a melting point below about 120° C., wherein the polymer comprises a block co-polymer, and wherein at least either the cation or the anion of the cation-anion pairs is polymer-bound.

2. Polymer electrolyte according to claim 1, characterised in that the ion-exchangeable functional groups comprise polymer-bound anionic groups.

3. Polymer electrolyte according to claim 2, characterised in that the anionic groups comprise at least one of the following groups: sulfonate, carboxylate, and phosphonate or any anionic surfactant group.

4. Polymer electrolyte according to claim 1, characterised in that the ionic liquid functional groups comprise polymer-bound cationic groups.

5. Polymer electrolyte according to claim 4, characterized in that the cationic groups comprise derivatives of at least one of the following groups: pyridinium, imidazolium, pyrrolidinium, alkyl-ammonium, alkyl-phosphonium, sulphonium, thiazolium, triazolium, oxazolium, pyrazolium, undecenium, guanidinium, isoquinolinium.

6. Polymer electrolyte according to claim 1, characterized in that at least part of the ionic liquid functional groups are bound to the polymer by a flexible spacer of a first length.

7. Polymer electrolyte according to claim 1, characterized in that at least some of the ion-exchangeable functional groups are bound to the polymer by a flexible spacer of a second length.

8. Polymer electrolyte according to claim 1, characterized in that the ratio of the ion-exchangeable groups with respect to the total of monomers incorporated in the polymer is in the range of 10-50%.

9. Polymer electrolyte according to claim 1, characterized in that the molecular ratio of ion-exchangeable functional groups with respect to ionic liquid functional groups incorporated in the polymer is in the range of 0.5-2.

10. Polymer electrolyte, for use in an electrochemical device, said polymer electrolyte comprising at least one polymer having polymer-bound ion-exchangeable functional groups, wherein the polymer comprises ionic liquid functional groups comprising cation-anion pairs and a block co-polymer of a relatively flexible polymer and a relatively rigid polymer, and wherein at least either the cation or the anion of the cation-anion pairs is polymer-bound.

11. Polymer electrolyte according to claim 10, characterized in that the relatively flexible polymer and the relatively rigid polymer show at least partial micro-phase separation.

12. Polymer electrolyte according to claim 10, characterized in that the relatively rigid polymer shows at least partial liquid crystalline order.

13. Polymer electrolyte, for use in an electrochemical device, said polymer electrolyte comprising at least one polymer having polymer-bound ion-exchangeable functional groups, wherein the polymer comprises ionic liquid functional groups comprising cation-anion pairs having a melting point below about 120° C., said polymer further comprising sulfonated aramids, and wherein at least either the cation or the anion of the cation-anion pairs is polymer-bound.

14. Polymer electrolyte according to claim 1, characterized in that the polymer comprises cross-links.

15. Polymer electrolyte according to claim 1, characterized in that the polymer is incorporated in a supporting matrix structure.

16. Electrical device comprising a polymer electrolyte material, said polymer electrolyte comprising at least one polymer having polymer-bound ion-exchangeable functional groups, characterised in that the polymer comprises ionic liquid functional groups comprising cation-anion pairs having a melting point below about 120° C., wherein the polymer comprises a block co-polymer, and wherein at least either the cation or the anion of the cation-anion pairs is polymer-bound.

17. Electrical device according to claim 16, characterised in that the device is a fuel cell.

18. Electrical device according to claim 16, characterised in that the electrical device is an electrical battery.

19. Electrical device according to claim 16, characterised in that the electrical device is a super capacitor.

20. Electrical device according to claim 16, characterised in that the electrical device is an electrochromic window.

21. Electrical device according to claim 16, characterised in that the electrical device is a solar cell.

22. Electrical device comprising a polymer electrolyte material, said polymer electrolyte comprising at least one polymer having polymer-bound ion-exchangeable functional groups, characterised in that the polymer comprises ionic liquid functional groups comprising cation-anion pairs having a melting point below about 120° C. and a block co-polymer of a relatively flexible polymer and a relatively rigid polymer, wherein at least either the cation or the anion of the cation-anion pairs is polymer-bound.

23. Electrical device comprising a polymer electrolyte material, said polymer electrolyte comprising at least one polymer having polymer-bound ion-exchangeable functional groups, characterised in that the polymer comprises ionic liquid functional groups comprising cation-anion pairs having a melting point below about 120° C. and further comprises sulfonated aramids, wherein at least either the cation or the anion of the cation-anion pairs is polymer-bound.

24. Polymer electrolyte according to claim 13, characterised in that the polymer comprises cross-links.

25. Polymer electrolyte according to claim 13, characterised in that the polymer is incorporated in a supporting matrix structure.

* * * * *